Feb. 13, 1968  J. A. RIETDIJK  3,368,361
DEVICE FOR MAINTAINING OBJECTS AT A LOW TEMPERATURE
OF THE KIND COMPRISING A CONTAINER FOR BOILING
LIQUIDS, HAVING A HEAT-INSULATING WALL

Filed July 8, 1966  2 Sheets-Sheet 1

INVENTOR.
JOHAN A. RIETDIJK
BY
AGENT

United States Patent Office 3,368,361
Patented Feb. 13, 1968

3,368,361
DEVICE FOR MAINTAINING OBJECTS AT A LOW TEMPERATURE OF THE KIND COMPRISING A CONTAINER FOR BOILNG LIQUIDS, HAVING A HEAT-INSULATING WALL
Johan Adriaan Rietdijk, Emmasingel, Eindhoven, Netherlands, assignor to North American Philips Company, Inc., New York, N.Y., a corporation of Delaware
Filed July 8, 1966, Ser. No. 563,887
Claims priority, application Netherlands, July 22, 1965, 65—9,477
2 Claims. (Cl. 62—45)

ABSTRACT OF THE DISCLOSURE

A device for maintaining articles at a low temperature comprising a housing having spaced receptacles therein at different levels. A tubular hollow element supports the receptacle and is provided with partitions and openings which determine the maximum level of liquid medium in each receptacle, the excess medium overflowing into the next lower receptacle.

---

The invention relates to a device for maintaining objects at a low temperature, comprising a container for boiling liquids, having a heat-insulating wall, particularly a multi-wall vacuum insulation.

Devices of the kind set forth are employed, for example, for maintaining objects such as electronic circuit arrangements as a whole at a given, low temperature. These objects are submerged in a liquid which boils at a low temperature and is contained in an insulated vessel (Dewar flask). The vapour pressure above the liquid is kept constant. The liquid is often liquid helium, liquid nitrogen and the like.

The known devices have the disadvantage that the static pressure distribution in the container in the vertical sense gives rise to temperature variations in said sense.

If the objects have great dimensions in the vertical direction, unacceptable temperature differences may occur between the bottom side and the upper side.

This disadvantage may be overcome by providing an agitator in the container, but this brings about great complications especially at the very low temperatures of the liquids usually employed.

A further possibility of overcoming said disadvantage consists in providing small dimensions of the objects in the vertical sense and greater ones in the horizontal sense. In that case the containers involved will have great horizontal dimensions, so that heavy losses are involved.

The invention has for its object to overcome the disadvantage of the temperature variation due to the hydrostatic pressure in a simple manner without incurring the disadvantages of the solutions referred to above.

The device according to the invention is characterized in that inside the container a number of dishes suitable for containing liquid are arranged at different levels.

The components to be assembled may be disposed on the various dishes and be submerged in the liquid. The liquid level in each dish is thus only part of the overall height of the container so that the hydrostatic pressure differences may be small, which ensures a uniform temperature. Since the dishes are housed in a common vapour space, the vapour pressure above each dish is the same.

In order to provide the dishes in a suitable manner with liquid, they are constructed, in a further embodiment of the invention, so that the liquid of a dish, when flowing at a given level over the rim or another overflow, is collected in the dish below.

In a further advantageous device embodying the invention the dishes are all secured to a tubular element, which is provided at least between every two adjacent dishes with a partition, which closes the tubular element, the wall of the element being provided above each partition with one or more openings for the supply of medium to the dish located beneath it, whilst between each partition and the dish secured to the element beneath it the wall of the element is also provided with one or more openings which determine(s) the maximum height of liquid in the dish concerned.

In the device thus obtained the dishes with any objects to be cooled arranged on them can be readily removed from the container.

In a further development of the device embodying the invention the dishes are individually integral with the inner wall of the container.

The invention will be described more fully with reference to the drawing.

Figures 1, 1A:
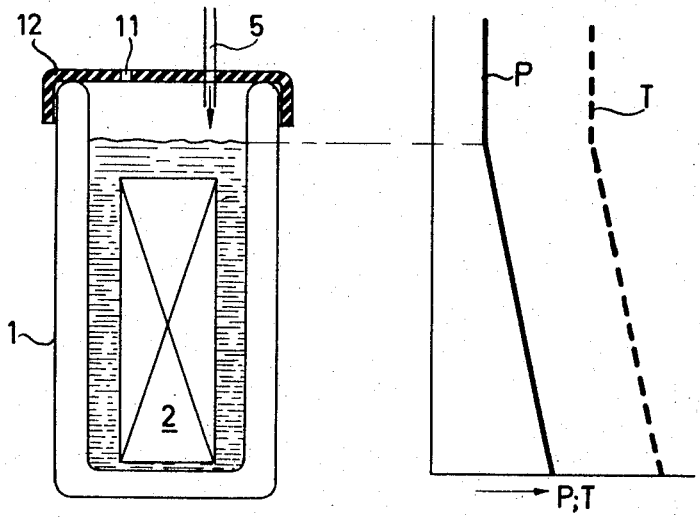
FIG. 1 shows diagrammatically, and not to scale, a known, insulated container for boiling liquid with an object to be cooled arranged therein.

Referring to FIG. 1, reference numeral 1 designates a double-walled, vacuum-insulated container (Dewar flask). The vacuum space between the walls may be provided with an insulating substance. The vessel contains a cold, boiling liquid, for example liquid helium. The liquid is in a state of equilibrium with the vapor above it. The vapor pressure is kept constant, for example at atmospheric pressure, as is indicated in the drawing. However, the container 1 may be closed on the upper side and a different value may be provided for the vapor pressure. An object 2 is dipped in the liquid. This object may be an electronic circuitry which has to be cooled as a whole to a low temperature.

FIG. 1a illustrates the pressure and temperature variations due to the hydrostatic pressure in the container.

It will be seen that the pressure on the upper side of the object 2 differs from that on the bottom side. Consequently also the temperature at the upper side will differ from that at the lower side. This is harmful to the satisfactory operation of for example, electronic circuitry.

Figures 2, 2A:
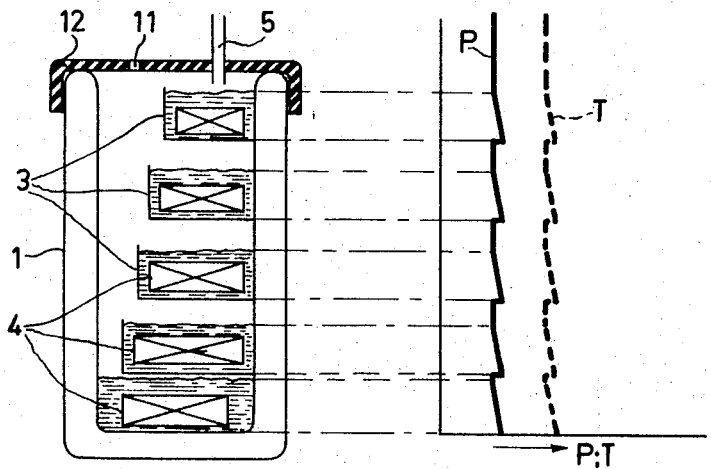
FIGS. 2 and 3 show diagrammatically, and not to scale, devices for maintaining objects at a low temperature, comprising containers for boiling liquids provided with dishes for receiving the objects to be cooled.

FIG. 2 shows diagrammatically a device for maintaining a low temperature of objects, for example circuitry, said device also comprising a vacuum-insulated container 1. To the inner wall of the container dishes 3 are secured at different levels. A part 4 of the object to be cooled is disposed on each of these dishes 3. This is possible, of course, only in the case of divisible objects, such as electronic circuit arrangements. Liquid, for example liquid helium can be introduced into the dishes through a supply duct 5, whereas vapor can escape through the opening 11 in the lid 12. When the upper dish is full, the liquid flows across the rim into the adjacent lower dish and so on. The vapor pressure is the same above each dish and is kept constant.

The pressure and the associated temperature variations involved are shown in FIG. 2a. It will be apparent that the temperature is considerably more uniform, so that each part of the object to be cooled has substantially the same temperature. The effect of such an object is thus materially improved.

Figures 3, 3A:
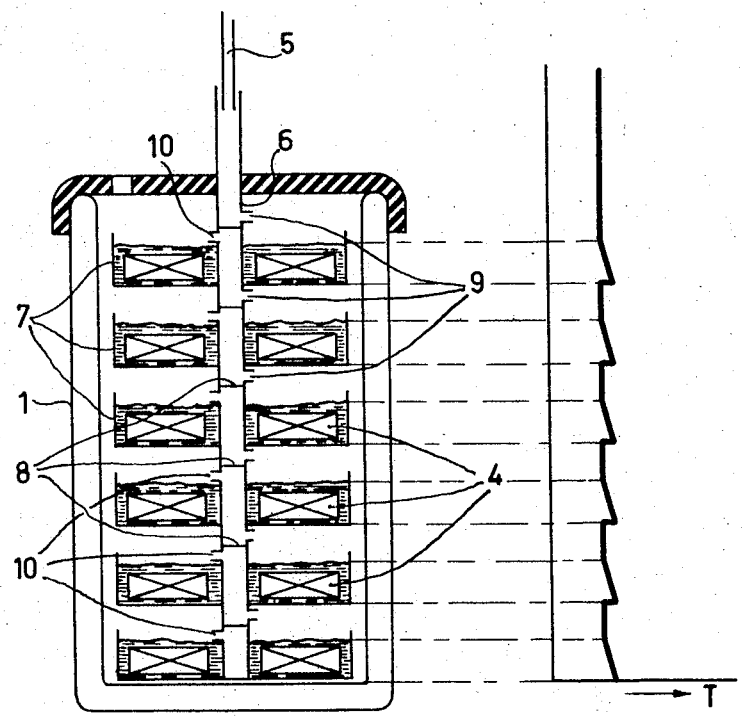

FIG. 3 also shows a device for maintaining a low temperature of objects. This device comprises an insulated container 1 (Dewar flask), in which a central, tubular element 6 is arranged, to which dishes or receptacles 7 are secured. A number of partitions 8 are provided in the tubular element. Just above each of said partitions the wall of the tubular element 6 has openings 9 and the wall of the tubular element 6 has furthermore openings 10, which determine the maximum level of the liquid in each of the dishes. The liquid can be supplied through the duct 5, which opens out in the tubular element 6. If desired, the duct 5 may open out directly in the upper dish. The liquid then arrives at the upper partition 8 and flows through openings 9 into the upper dish. When the liquid in said dish reaches the opening 10, it flows from said dish into the tubular element and thus arrives in the next dish and so on.

The components 4 of the object can be disposed on the dishes.

From FIG. 3a it will be apparent that the temperature is substantially anywhere the same, so that all components 4 have the same temperature.

The device shown in FIG. 3 has the advantage that the tubular element 6 with the dishes secured thereto can be very readily arranged in the container and removed therefrom, so that the insertion of the components to be cooled and any inspection can be carried out very easily.

From the foregoing it will be obvious that by very simple means the invention provides a device for maintaining a low temperature of objects, in which temperature differences due to hydrostatic pressure are not a source of trouble.

What is claimed is:

1. A device for maintaining articles at a low temperature comprising a container for low temperature liquids having a heat insulating wall, a hollow element in said container for supplying liquid medium to said container, a plurality of receptacles adapted to contain liquid medium therein mounted on said hollow element at different levels, said articles to be cooled being disposed in said receptacles, at least one partition in said hollow element, said partition closing the through passage in said hollow element, at least one opening in said hollow element above each partition for supplying said liquid medium to the receptacle adjacent to and lower than said opening, and at least one overflow opening below each partition and a receptacle directly under said overflow opening, said overflow opening determining the maximum level of said liquid medium in each receptacle, the excess liquid medium overflowing into the next lower receptacle.

2. A device for maintaining articles at a low temperature as claimed in claim 1 wherein said hollow element is tubular.

References Cited

UNITED STATES PATENTS

| 262,145 | 8/1882 | Stout | 62—461 |
| 311,813 | 2/1885 | Collings et al. | 62—461 |
| 311,814 | 2/1885 | Collings et al. | 62—461 |
| 345,776 | 7/1886 | Fowler | 62—461 |
| 1,391,592 | 9/1921 | Stone | 62—461 |
| 2,831,329 | 4/1958 | Morrison | 62—373 |

LLOYD L. KING, *Primary Examiner.*